United States Patent [19]

Imai

[11] 4,318,535
[45] Mar. 9, 1982

[54] REAR WHEEL SUSPENSION FOR MOTORCYCLES

[75] Inventor: Kiyonori Imai, Gifu, Japan

[73] Assignee: Kayabakogyokabushikikaisha, Tokyo, Japan

[21] Appl. No.: 84,176

[22] Filed: Oct. 12, 1979

[30] Foreign Application Priority Data

Oct. 14, 1978 [JP] Japan ............................ 53-140990[U]

[51] Int. Cl.³ .......................... F16F 9/19; B60G 11/56
[52] U.S. Cl. .................................. 267/8 R; 188/319;
267/34; 267/61 R
[58] Field of Search ............. 267/8 R, 34, 20 C, 64 R,
267/64 B, 65 R, 61 R, 121, 169; 188/319

[56] References Cited

U.S. PATENT DOCUMENTS

| | | | |
|---|---|---|---|
| 2,171,185 | 8/1939 | Maier | 267/34 |
| 2,475,774 | 7/1949 | Benson | 267/8 R |
| 2,902,274 | 9/1959 | McIntyre | 267/8 R |
| 3,447,797 | 6/1969 | Roberts | 267/64 R |
| 3,874,307 | 4/1975 | Schwam | 267/8 R |
| 4,159,756 | 7/1979 | Murakami et al. | 188/319 |

FOREIGN PATENT DOCUMENTS

309079  4/1918  Fed. Rep. of Germany .... 267/61 R

Primary Examiner—Edward R. Kazenske
Attorney, Agent, or Firm—Saul Jecies

[57] ABSTRACT

A rear wheel suspension for motorcycles which comprises a hydraulic damper of telescope type consisting of telescopic inner and outer tubes and a suspension coil spring positioned in these tubes. In order to stabilize the damping characteristics, and at the same time, to prevent the inner end cross section of the inner tube from fouling the suspension coil spring and thereby causing unsatisfactory operation, abnormal noise and other problems, one part of the suspension coil spring, which is located in the outer tube under the condition where the hydraulic damper is extended to the maximum, is made smaller in pitch diameter than the other part, which is located in the inner tube so that the inside working oil flow due to its expansion or compression may be hardly hindered by the part of the suspension coil spring that is located in the outer tube. Furthermore, positioned at one end of the suspension coil spring in series is a jolt-preventive coil spring, which makes it possible, when the hydraulic damper is extended to the maximum to reduce the initial load of the suspension coil spring to zero or close to zero, so that device may give the motorcycle rider an improved feeling of suspension on his ride.

4 Claims, 3 Drawing Figures

REAR WHEEL SUSPENSION FOR MOTORCYCLES

BACKGROUND OF THE INVENTION

The present invention relates to a rear wheel suspension for motorcycles which is formed by fitting a suspension coil spring into a hydraulic damper of telescope type consisting of inner and outer telescopic tubes.

In conventional motorcycle front wheel suspensions, as seen in Japanese Utility Model Publication Nos. 27406/1973 and 1163/1974, for instance, use is commonly made of a front fork formed by fitting a suspension coil spring into a hydraulic damper of telescope type consisting of inner and outer telescopic tubes. However, a few hydraulic dampers of this type which also work as a suspension are used for the rear wheel suspension of motorcycles.

The reason may be explained by the following. First of all, in the case of motorcycles, the rear wheel normally receives a larger load than does the front wheel, making it common practice to use in the rear wheel suspension a strong coil spring having a spring constant 1.5–1.8 times higher than that used in the front wheel suspension. This inevitably makes the suspension coil used in the rear wheel suspension larger in wire diameter than that used in the front wheel, suspension, and consequently, the said suspension coil spring hinders the working oil flow in the hydraulic damper when the rear wheel suspension is in operation so that its damping characteristics deteriorate. Next, in the case of rear wheel suspension which is more closely related to the riding comfort of motorcycles, it is desirable, in order to retain a good feeling, that the Road of the suspension coil spring be minimized when the hydraulic damper is extended close to the maximum. To this end, use could be made of an additional spring member that would counter the suspension coil spring when the hydraulic damper was extended close to the maximum, or otherwise, the suspension coil spring could be set beforehand so as to reach its normal length when the hydraulic damper is extended to the maximum. The former measure is difficult to practice spatially however, because the rear wheel suspension has a strict limitation in total length, differing from front wheel suspensions, while the latter measure causes the suspension coil spring, as it has received a permanent setting, to jolt in the hydraulic damper every time it is extended to the full, and this rather impairs the feeling of the suspension not only degrading the riding comfort but also generating noises unpleasant to the rider.

Nonetheless, if these defects could be resolved, and if a rear wheel suspension of this type could be realized, there would be the significant merit that mass-production would be made possible through minimizing of the changes in the production arrangements required to make best use of the similarity between the structural parts of the front wheel and rear wheel suspensions.

SUMMARY OF THE INVENTION

The purpose of the present invention is to offer a simple and reliable rear wheel suspension of the said type for motorcycles overcoming the abovementioned drawbacks.

For that purpose, in the present invention, the pitch diameter of the part of the suspension coil spring located in the outer tube under the most extended condition of the hydraulic damper is made smaller than that of the part of the suspension coil spring located in the inner tube, and an adequate passage is secured in the inner tube bore that carries the part of the suspension coil spring of smaller pitch diameter so as to prevent the coil spring from blocking the inside working oil flows resulting from expansion or compression of the hydraulic damper. This not only ensures stable damping characteristics, but also makes it possible to prevent the inner end cross section of the inner tube from fouling the suspension coils spring and causing unsatisfactory operation, abnormal noise and other problems. At the same time, disposed at one end of the said suspension coil spring in series is a jolt-prevention coil spring having a low spring constant, so as to make it possible to reduce the initial load of the suspension coil spring to zero or close to zero in the condition that the hydraulic damper is extended to maximum, with the feeling of the suspension thus remaining good and the riding comfort being improved.

The abovementioned and other purposes and merits of the present invention will be clarified in the following detailed description of the preferred embodiments of the present invention and its novel features will be indicated, particularly in the claims thereafter.

DETAILED DESCRIPTION OF PREFERRED EMBODIMENTS OF INVENTION

Figure 1:
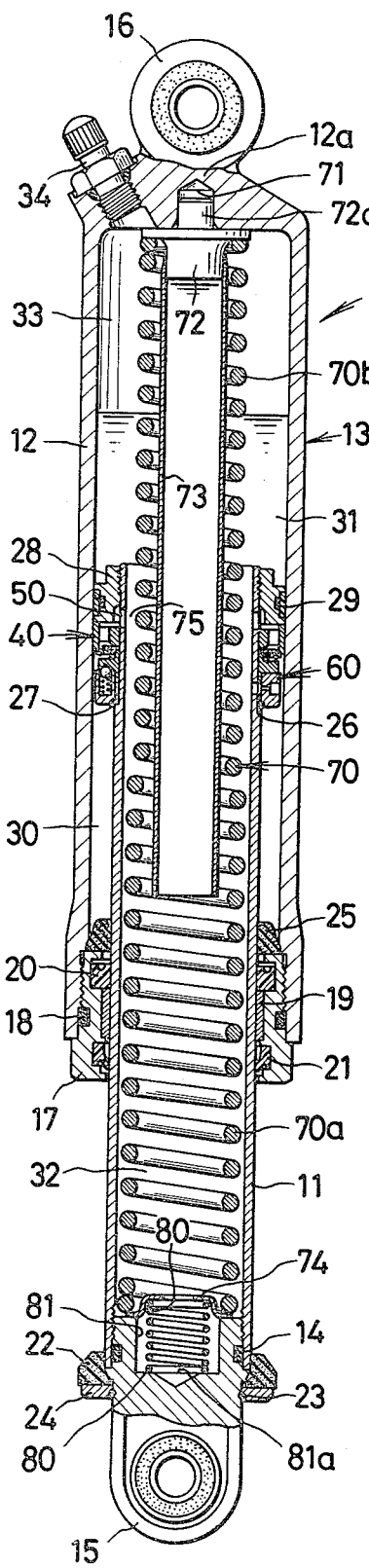
FIG. 1 represents a longitudinal front section of a rear wheel suspension for motorcycles showing an embodiment of the present invention.

In FIG. 1, the rear wheel suspension 10 for motorcycles comprises a hydraulic damper 13 of telescope type consisting of a pair of tubes, metallic inner tube 11 and outer tube 12, arranged so as to move back and forth freely in relation to each other, and a suspension coil spring 70 positioned in these inner and outer tubes 11, 12 along the whole length. In this example, the said rear wheel suspension 10 is fitted to motorcycles with the outer tube 12 upward. However, as with conventional front wheel suspensions in common use, it may also be used with the inner tube upward.

The inner tube 11 is provided with the damping force generating mechanism 40 and the damping force adjusting mechanism 60 around the outer circumference of the tube's upper end is inserted into in the outer tube 12 through its lower open end. The lower end of the inner tube 11 is closed with the under bracket 15 which is screwed in with the seal 14 fitted around the outer circumference. This under bracket 15 is connected by conventional means to the rear wheel axle of the motorcycle or its support such as a swing arm.

On the other hand, the upper end of the outer tube 12 is closed by the cover part 12a which is integral with the tube. This cover part 12a has the upper bracket 16, which is also integral with the tube and is connected by conventional means to the motorcycle body the same as the under bracket 15 abovementioned.

In order to tightly seal the inner tube 11 with respect to outer tube 12, the packing holder 17 with the seal 18 fitted around the outer circumference is screwed in the lower open end of the outer tube 12. This packing holder 17 is fitted with the sliding metal part 19 around the inner circumference and with the oil seal 20 and dust seal 21 located at both of the sliding metal part's sides, so that the sliding metal part 19 may guide the inner tube 11 while permitting its outer surface to slide in contact with the sliding metal, so that the oil seal 20 working in conjunction with the seal 18 of the said packing holder 17 may seal the inside of the outer tube 12 against the outside, and so that the dust seal 21 may prevent dust and other foreign matter from entering under the sliding metal part 19.

The cushion rubber 22, positioned around the outer circumference of the lower end of the inner tube 11, is supported at the lower face by the washer 24 fastened by means of the snap ring 23 fitted in the under bracket 15, and limits the ultimate compressed position of the hydraulic damper 13 as its end hits the packing holder 17 of the outer tube 12 in accordance with the compression of the hydraulic damper 13 while damping the impact then occurring. Also, in the same manner, the stop rubber 25, which is located in the outer tube 12 positioned at the upper part of the packing holder 17, hits the damping force adjusting mechanism 60 of the inner tube 11, as the hydraulic damper 13 is extended, to limit the ultimate extended position of the hydraulic damper 13 while damping the impact then occurring.

The damping force generating mechanism 40, which is positioned at the upper end of the inner tube 11, is fixed between the washer 27 fastened at the outer circumferential step part 26 of the inner tube 11 and the nut member 28 screwed on the upper end of the inner tube 11, while the damping force adjusting mechanism 60 is positioned, so as to rotate freely, under the said damping force generating mechanism 40.

The nut member 28 slides at the outer circumference in contact with the inner wall of the outer tube 12 via the seal member 29 and, in conjunction with the sliding metal part 19 of the packing holder 17 abovementioned, guides the relative motion of the inner tube 11 and outer tube 12 when the hydraulic damper 13 is extended or compressed. Meanwhile, the said seal member 29 positioned around the outer circumference of the said nut member 28, working in conjunction with the seal 18 and oil seal 20 of the packing holder 17 screwed in the lower open end of the outer tube 12, partitions the chamber 30 between the inner tube 11 and outer tube 12 while isolating this chamber 30 from the chamber 31 formed in the outer tube 12. This chamber 31 is always connected to the chamber 32 in the inner tube 11 through the upper open end of the inner tube 11.

The said chamber 30 between the inner tube 11 and the outer tube 12 and the chamber 32 in the inner tube 11 are both filled up with working oil, while the chamber 31 in the outer tube 12 is filled with working oil leaving the gas chamber 33 at the upper part. The gas chamber 33 is filled up with pressurized air or another pressurized inert gas such as nitrogen, which is supplied through the charge valve 34 fitted to the cover part 12a of the outer tube 12. This pressurized gas in the gas chamber 33 compensates for the volume of the inner tube 11 which changes according to the motion relative to the outer tube 12 when the hydraulic damper 13 is extended or compressed. Thus, it not only gives a spring effect to the hydraulic damper 13 while working in conjunction with the suspension coil spring 70 of which there will be mentions below, but also pressurizes the working oil to facilitate its entrance into the chamber 30 when the hydraulic damper 13 is compressed as also described below.

Figure 2:
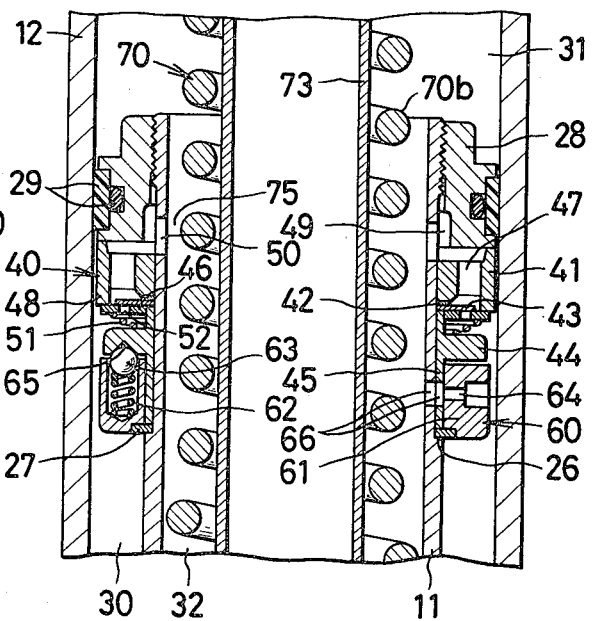
FIG. 2 represents an enlarged partial longitudinal front section showing the piston part.

As seen from the enlarged section shown in FIG. 2, the damping force generating mechanism 40 consists of the subassembly of piston 41, shim 42, leaf valve 43 and valve stop 45 with the flange 44 attached at the outer circumference and the non-return valve 46 which is positioned, so as to move vertically, along the upper outer circumference of the said valve stop 45. The said subassembly is fixed to the inner tube 11, as aforementioned, with the washer 27 fastened at the outer circumferential step part 26 of the inner tube 11 and the nut member 28 screwed on the upper end of the inner tube 11.

The said piston 41 has a number of large through holes 47 (only two are shown in FIG. 2) and the annular outer rising part 48 hanging from the flat crown part. These through holes 47 are connected at one end to the chamber 30 through the leaf valve 43 and non-return valve 46 and at the other end of the chamber 32 through the cavity 49 formed in the nut member 28 and the through hole 50 bored in the inner tube 11. The outer rising part 48 forms an outer valve seat for the outer circumferental upper face of the non-return valve 46 as its lower face stops the non-return valve 46.

The leaf valve 43 is formed as an annular flexible plate or disk, and its inner circumferential part is fixed between the shim 42 and the valve stop 45. The non-return valve 46 is formed as an annular rigid plate or disk, and is pressed against the outer rising part 48 of the piston 41 by the relatively weak spring member 51 positioned between the valve 46 and the flange 44 of the valve stop 45. The size of the holes 52 bored in the non-return valve 46 is selected so as to give no substantial resistance to the working oil flowing through these holes, which are normally closed by the leaf valve 43.

On the other hand, the adjuster member 61 which forms the damping force adjusting mechanism 60 is positioned so as to rotate freely, around the outer circumference of the valve stop 45 in the damping force generating mechanism 40, while its vertical motion is limited by the washer 27 and the flange 44.

This adjuster member 61 has the ball member 63 pressed by a spring member 62 and the group of orifices 64 which are varied in diameter and bored at an even interval in the radial direction (Only one is shown in FIG. 2). The said ball member 63 fits selectively in one of the group of cavities 65 which are formed in the flange 44 of the valve stop 45 (The interval of these cavities is identical to that of the group of orifices 64 abovmentioned, and only one is shown in FIG. 2) and, under this condition, an arbitrary orifice among the said group of orifices 64 aligns with the through hole 66 which passes through the inner tube 11 and valve stop 45.

Thus, when the lower face of the adjuster member 61 is pressed against the stop rubber 25 in the condition that the hydraulic damper 13 is extended to the maximum, and when a relative rotation is given in that condition to the inner tube 11 and outer tube 12, the inner tube 11 and valve stop 45 will be simultaneously displaced relative to the adjuster member 61, so that one of the said group of orifices 64 that connects the chamber 30 and the chamber 32 may be selected. However, since this damping force adjusting mechanism 60 is not very important in the present invention, and since its principles are readily understood as they are already disclosed in the Specification of U.S. Pat. No. 4,159,756, further description in detail will be omitted.

Thus, when the hydraulic damper 13 is in compression motion, the working oil in the chamber 32 is pushed into the chamber 30 passing through the through hole 50, the cavity 49 and the through hole 47 and pushing the non-return valve 46 open against the spring member 51 without receiving much resistance, so that the hydraulic damper 11 may perform its compression motion while generating minimum damping force. When the hydraulic damper 13 shifts to the extension motion, the non-return valve 46 receives oil pressure from the chamber 30 and closes the lower face of the piston 41. Thus, in the case where the extension speed is relatively low, the working oil in the chamber 30 is pushed into the chamber 32 through an orifice selected from the group of orifices 64 of the damping force adjusting mechanism 60 and the through hole 66 and produces a damping force having characteristics proportional to the square of the extension speed. On the other hand, when the extension speed becomes high and the oil pressure in the chamber 39 over comes the rigidity of the leaf valve 43, the outer circumferential part of this leaf valve 43 warps upward and the working oil in the chamber 30 is pushed into the chamber 32 not only from the abovementioned holes but also from the through hole 50 via the hole 52 of the non-return valve 46, the outer circumference of the leaf valve 43, the through hole 47 and the cavity 49 and produces a damping force proportional to the extension speed. It can be understood, therefore, that the hydraulic damper 13 is capable of producing damping characteristics as required according to its compression or extension motion.

The suspension coil spring 70, an important element in the present invention, is incorporated along the whole length in the inner tube 11 and outer tube 12 which form the said hydraulic damper 13.

Referring back to FIG. 1, the cover part 12a of the outer tube 12 has the cavity 71 in the lower face, and this cavity 71 receives the leg 72a of the upper spring guide 72 to perform its centering. The upper spring guide 72 has the pipe member 73 fixed to it, and this pipe member 73 hangs downward along the center line in the outer tube 12.

The suspension coil spring 70 is supported at the upper end by the lower face of the cover part 12a of the outer tube 12 through the medium of the said upper spring guide 72, and it is supported also at the lower end by the upper face of the said under bracket 15 through the lower spring guide 74 which is mounted on the under bracket 15 in the inner tube 11. Thus, the restoring force of the said suspension coil spring 70 works in a direction such that the hydraulic damper 13 is caused to extend and suspend the rear wheel of the motorcycle.

The lower half 70a of the said suspension coil spring 70 extends along the inner wall of the inner tube 11, while the upper half 70b extends along the outer wall of the pipe member 73 hanging downward from the said upper spring guide 72. Thus, the buckling phenomena of the suspension coil spring 70 occurring with the compression motion of the hydraulic damper 13 are prevented, since the outer face of the lower half 70a of the suspension coil spring 70 is supported by the inner wall of the inner tube 11, and since the inner face of the upper half 70b is supported by the outer wall of the pipe member 73.

If the suspension coil spring 70 were positioned very close to the through hole 50 of the inner tube 11, the suspension coil spring 70 would impede the working oil flow being pushed into the chamber 32 through the through hole 50 or conversely being pushed into the chamber 30 through the said through hole 50 in accordance with the extension or compression motion of the hydraulic damper 13, and this would make the damping force of the hydraulic damper 13 unstable, resulting in a degradation of its damping characteristics. In order to prevent this, however, the said suspension coil spring 70 of the present invention, has its upper half 70b made smaller in pitch diameter than its lower half 70a. This is very important. Namely, since the upper part of the suspension coil spring 70, including at least the portion which faces the said through hole 50 in the most extended condition of the hydraulic damper 13, is made smaller in pitch diameter than the lower part, it can be seen that the through hole 50 may secure a relatively large passage space 75 between it and the suspension coil spring 70 along the whole stroke length of the hydraulic damper 13 and that the damping force of the hydraulic damper 13 may be stabilized significantly, resulting in an improvement of its damping characteristics.

Figure 3:
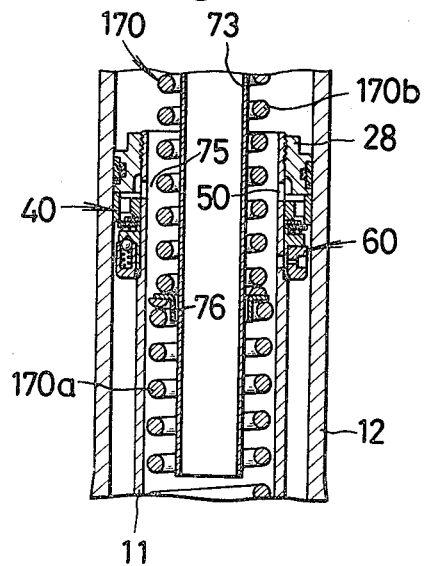
FIG. 3 represents a partial longitudinal front section showing another example of the suspension coil spring.

In the first example already described, the single suspension coil spring 70 is used, and its upper half 70b is made smaller in pitch diameter than its lower half 70a. As seen in the example of FIG. 3, however, the two suspension coil springs 170a, 170b of varied pitch diameter may also be used in place of the suspension coil spring 170. In this case, the spring guide 76 is fitted between these two suspension coil springs 170a, 170b in such a manner that the guide 76 may slide over the outer wall of the pipe member 73 as a guide.

In order to realize another important objective of the present invention, the jolt-prevention coil spring 80 is fitted in the cavity 81 which is formed in the upper face of the under bracket 15 of the inner tube 11, being disposed between the bottom part 81a of this cavity 81 and the said lower spring guide 74. When the suspension coil springs 70, 170 fall short of the required normal length in the condition that the hydraulic damper 13 is extended to the maximum, this jolt-prevention coil spring 80 may push up the lower end of the suspension coil springs 70, 170 through the lower spring guide 74, thus the suspension coil springs 70, 170 are prevented from jolting in the hydraulic damper 13. The jolt-prevention coil spring 80 may thus be very small in length and spring constant compared with the suspension coil springs 70, 170, and it is possible to incorporate this jolt-prevention coil spring 80 without making the hydraulic damper 13 longer in basic length. Since the jolt-prevention coil spring 80 thus makes it possible to reduce the initial load of the suspension coil springs 70, 170 to zero or close to zero in the condition that the hydraulic damper 13 is extended to the maximum, it contributes to an improved feeling of suspension.

In the above, the principles of the present invention are described referring to the particular devices. Needless to say, however, they are just for illustration and the present invention is by no means limited by the foregoing description.

What is claimed is:

1. Wheel suspension for motorcycles including an oleopneumatic shock absorber, comprising
an outer tube having a closed outer end and an inner end;
an inner tube having a closed outer end and an inner end and mounted for telescopic movement within said outer tube through said inner end of said outer tube;

a spring guide means secured to said closed outer end of said outer tube and extending into said inner end of said inner tube;

a suspension coil spring extending from said closed outer end of said outer tube around said spring guide means to the closed outer end of said inner tube;

the pitch diameter of a first part of said suspension coil spring located in said outer tube and around said spring guide means under the maximum extended telescopic position of said shock absorber being smaller than the pitch diameter of a second part of said suspension coil spring located in said inner tube to prevent the inner end of said inner tube from impinging on said coil spring;

a flow passage provided by said inner end of said inner tube and being of sufficient diameter to prevent the first part of said suspension coil spring of said smaller pitch diameter located within said inner tube from substantially reducing oil flow through said passage during telescopic movement of said shock absorber, the outer diameter of said smaller pitch diameter part of said coil spring being spaced from the inner surface of said inner tube defining said passage to allow substantially unimpeded flow of oil through said passage;

an oil damping device mounted on said inner tube adjacent said inner end thereof and communicating with said passage; and a freely rotatable damping force adjusting device secured to said inner tube adjacent its said inner end; said devices separating the enclosed space defined by said outer tube into a first oil chamber and a second oil chamber;

said first oil chamber being the space in said outer tube between said closed outer end thereof and said devices and the inside of said inner tube, said second oil chamber being the space bounded between the inner and outer tubes, the devices, and the inner end of the outer tube, said devices allowing substantially free flow of oil through said passage from said first oil chamber into said second oil chamber during the compression stroke of said shock absorber while exerting a substantial damping force during the extension stroke of said shock absorber, said damping force during the extension stroke being proportional to the extension stroke speed.

2. A wheel suspension for motorcycles as claimed in claim 1 wherein said damping force during the extension stroke of the shock absorber being proportional to the square of the extension stroke speed.

3. A wheel suspension for motorcycles as claimed in claim 1 comprising a jolt prevention coil spring located at one end of said suspension coil spring, said jolt preventing coil spring exerting a weak bias force in a compression direction on said suspension coil spring.

4. A wheel suspension for motorcycles as claimed in claim 1 comprising a cavity formed in the closed outer end of said inner tube; a spring end guide for said suspension coil spring loosely placed over said cavity and a jolt preventing coil spring housed in said cavity, said jolt preventing coil spring exerting a weak bias force in a compression direction on said suspension coil spring.

* * * * *